(12) United States Patent
McNutt (10) Patent No.: US 8,577,196 B1
(45) Date of Patent: Nov. 5, 2013

(54) JACKETED CABLE WITH CONTROLLED JACKET COUPLING

(75) Inventor: Christopher W. McNutt, Woodstock, GA (US)

(73) Assignee: Superior Essex Communications LP, Atlanta, GA (US)

( * ) Notice: Subject to any disclaimer, the term of this patent is extended or adjusted under 35 U.S.C. 154(b) by 251 days.

(21) Appl. No.: 13/068,654

(22) Filed: May 17, 2011

Related U.S. Application Data (60) Provisional application No. 61/395,737, filed on May 17, 2010.

(51) Int. Cl.
*G02B 6/44* (2006.01)
(52) U.S. Cl.
USPC .......................................... 385/107; 385/109
(58) Field of Classification Search
USPC ................................................ 385/107–108
See application file for complete search history.

(56) References Cited

U.S. PATENT DOCUMENTS

| 2005/0201696 | A1 | 9/2005 | Fee |
| 2008/0219627 | A1 | 9/2008 | Puzan et al. |
| 2009/0274426 | A1* | 11/2009 | Lail ............................. 385/105 |

OTHER PUBLICATIONS

Non Final Office Action Mailed Apr. 3, 2013 for U.S. Appl. No. 13/136,849.

\* cited by examiner

*Primary Examiner* — Jerry Rahll (57) ABSTRACT

A communication cable can comprise optical fibers protected by an armor, such as a corrugated metallic tube. An outer jacket can cover the armor to provide environmental protection. A tape located between the outer jacket and the armor can comprise holes, with the outer jacket extending into the holes, towards the armor. The tape can be wrapped around the armor to form a tube, for example. The holes can control coupling between the outer jacket and the armor, for example providing a desired level of friction, bonding, adhesion, adherence, fusion, and/or contact between the outer jacket and the armor.

20 Claims, 5 Drawing Sheets

JACKETED CABLE WITH CONTROLLED JACKET COUPLING

CROSS REFERENCE TO RELATED APPLICATIONS

This patent application claims priority under 35 U.S.C. §119 to U.S. Provisional Patent Application No. 61/395,737, entitled "Method and System for Water Blocking Cables" and filed May 17, 2010, the entire contents of which are hereby incorporated herein by reference.

FIELD OF THE TECHNOLOGY

The present invention relates to fiber optic cables and more specifically to providing an element between a jacket and an internal armor of a cable to control coupling between the jacket and the armor.

BACKGROUND

Fiber optic cables include one or more optical fibers or other optical waveguides that conduct optical signals, for example carrying voice, data, video, or other information. Optical fibers are ordinarily susceptible to damage from water and physical stress. Without an adequate barrier, moisture may migrate into a fiber optic cable and weaken or destroy the cable's optical fibers. Without sufficient physical protection, stress or shock associated with handling the fiber optic cable may transfer to the optical fibers, causing breakage or stress-induced signal attenuation.

Fiber optic cables often incorporate armor that offers mechanical protection, such as crush resistance. An outer jacket covers the armor for environmental protection. Cable designers seek to control adhesion between the jacket and the armor. Too little adhesion can result in an annular gap through which water can detrimentally migrate if the cable is inadvertently damaged. Too much adhesion can complicate field service operations that involve stripping the jacket.

Conventional technologies for controlling adhesion between the jacket and the armor are limited. One approach involves coating the armor with a polymer that adheres to the jacket but has a low cohesive strength to facilitate peeling the jacket from the armor. Another approach involves applying a hot melt substance, such as atatic polyolefin polymer, between the jacket and the armor. Such conventional approaches can pose challenges in terms of supply availability, manufacturing complications, and consistent performance.

Accordingly, to address such representative deficiencies in the art, improved cable technology is needed for protecting optical fibers while facilitating service operations. Need exists for controlling coupling between adjacent elements of a cable, including cable armor and cable jacketing. Need exists for blocking flow of water between armor and a jacket of a cable. Further need exists for covering a cable with a jacket that can be stripped or peeled in the field without undue labor or complicated tools or without risking damage to delicate optical fibers of the cable. Further need exists for cable jacketing technology that is conducive to economical manufacturing. A capability addressing one or more of the aforementioned needs, or some related shortcoming in the art, would promote optical fibers for communications and other applications.

SUMMARY

The present invention can support protecting one or more optical fibers in a cable package that facilitates field service. In one aspect of the present invention, a fiber optic cable can comprise armor, such as corrugated metal tubing, housing one or more optical fibers. A jacket can cover the armor and provide environmental protection. An element disposed between the jacket and the armor can extend circumferentially around the armor and run lengthwise along the fiber optic cable. The element can comprise holes, with the jacket material bulging into the holes towards the armor. The bulging jacket material can either contact the armor or bulge inward without making contact. The holes can control coupling between the jacket and the armor. Increasing number, geometry, and/or size of the holes can increase friction, bonding, adhesion, adherence, fusion, and/or contact between the outer jacket and the armor, for example.

The discussion of fiber optic cables presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with ordinary skill in the art upon examination of the following drawings and detailed description. It is intended that all such aspects, systems, methods, features, advantages, and objects are to be included within this description, are to be within the scope of the present invention, and are to be protected by the accompanying claims.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help convey such principles visually. In the drawings, reference numerals des-

DETAILED DESCRIPTION OF EXEMPLARY EMBODIMENTS

Embodiments of the present invention can support protecting an optical fiber from damage associated with applied forces and moisture incursion. Afforded mechanical protection can include stabilizing the optical fiber and/or cushioning the optical fiber from mechanical impact, shock, physical stress, jarring, unwanted motion, damaging acceleration or deceleration, force, or other detrimental effect.

A fiber optic cable can comprise a jacket that extends longitudinally, along the fiber optic cable, over an armor or other element or elements providing crush resistance. The jacket can comprise a sheath, a sheathing, a casing, a shell, a skin, or a tube spanning the fiber optic cable, typically comprising pliable or flexible material such as plastic or polymer. Accordingly, the jacket can run lengthwise along the fiber optic cable and cover an armor or other element or elements for imparting the cable with desirable mechanical attributes. A tape located between the jacket and the armor or other element or element can provide controlled coupling of the jacket to the armor or other cable element.

Figure 1:
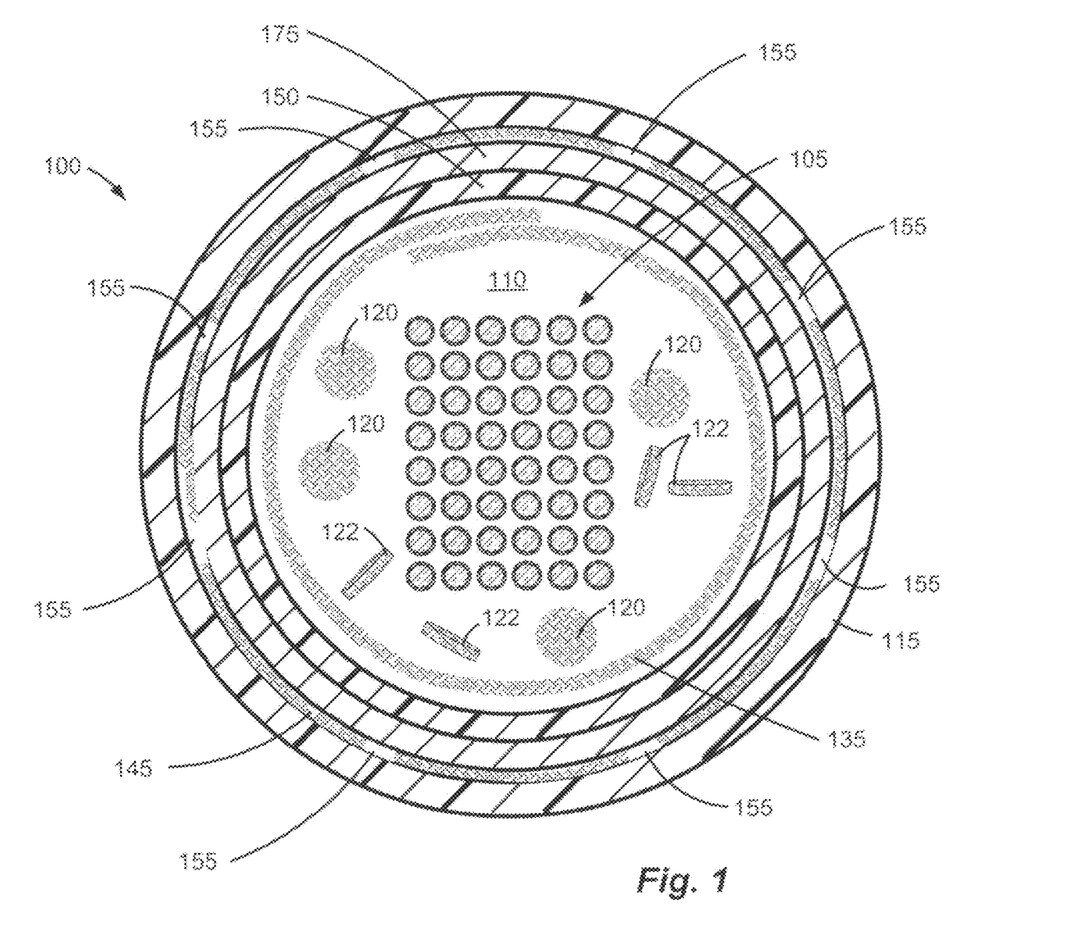
FIG. 1 is a cross sectional illustration of an exemplary fiber optic cable that provides controlled coupling between a jacket and an armor of the cable in accordance with certain embodiments of the present invention.
Figure 2:
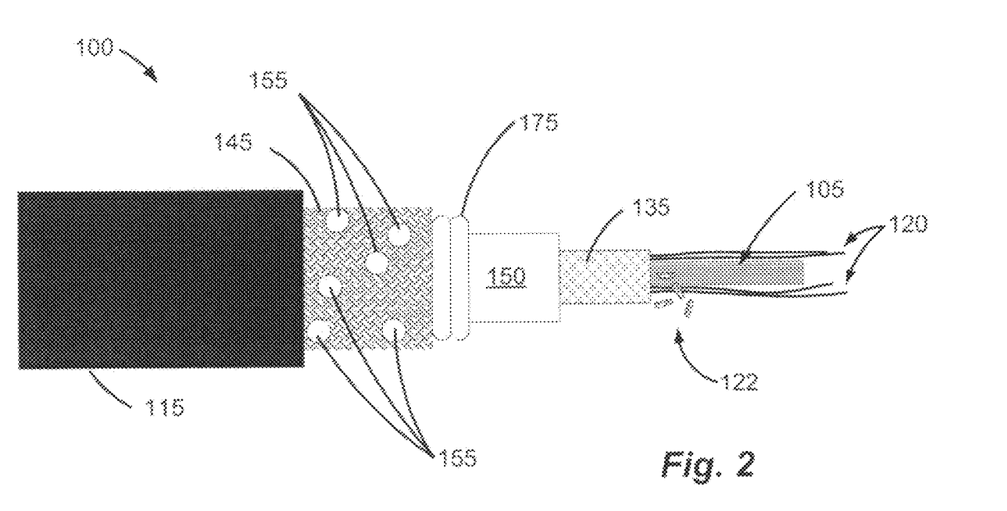
FIG. 2 is a side illustration of an exemplary fiber optic cable that provides controlled coupling between a jacket and an armor of the cable in accordance with certain embodiments of the present invention.
Figure 3:
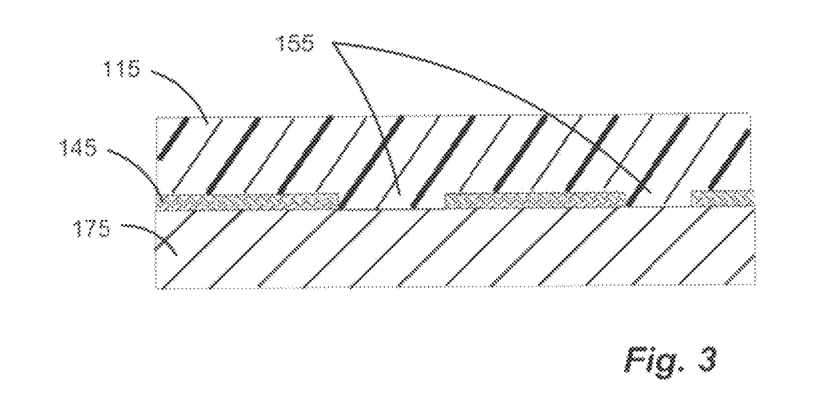
FIG. 3 is a cross sectional illustration of an exemplary interface between a jacket and an armor of a fiber optic cable in accordance with certain embodiments of the present invention.
Figure 4:
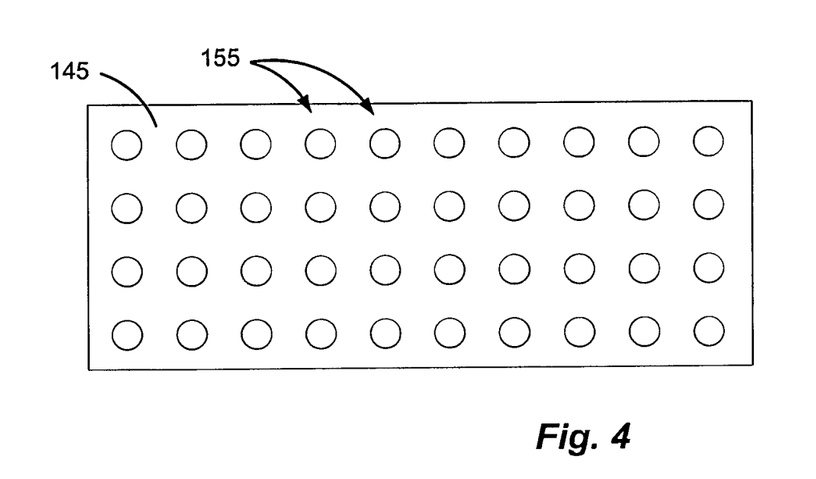
FIG. 4 is a plan view of a section of an exemplary tape for disposing between a jacket and an armor of a fiber optic cable in accordance with certain embodiments of the present invention.
Figure 5:
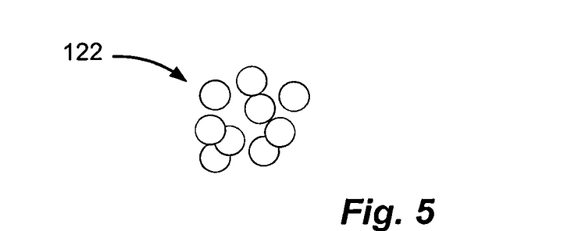
FIG. 5 is an illustration of exemplary tape fragments that can be disposed in a fiber optic cable in accordance with certain embodiments of the present invention.
Figure 6:
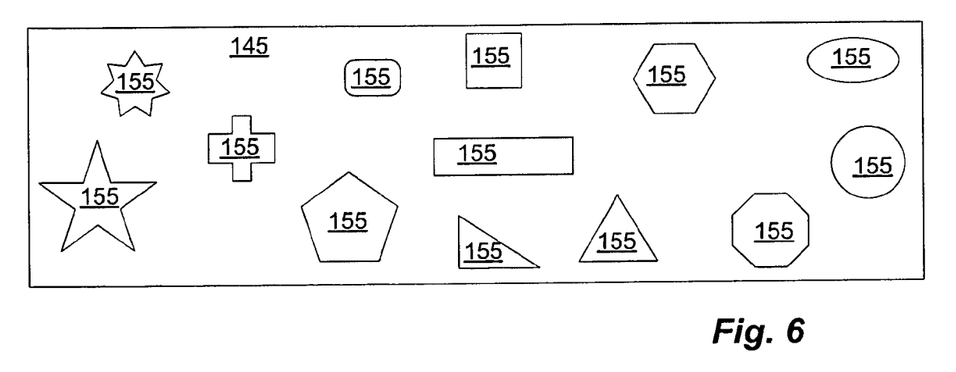
FIG. 6 is a plan view of a section of an exemplary tape for disposing between a jacket and an armor of a fiber optic cable in accordance with certain embodiments of the present invention.
Figure 7:
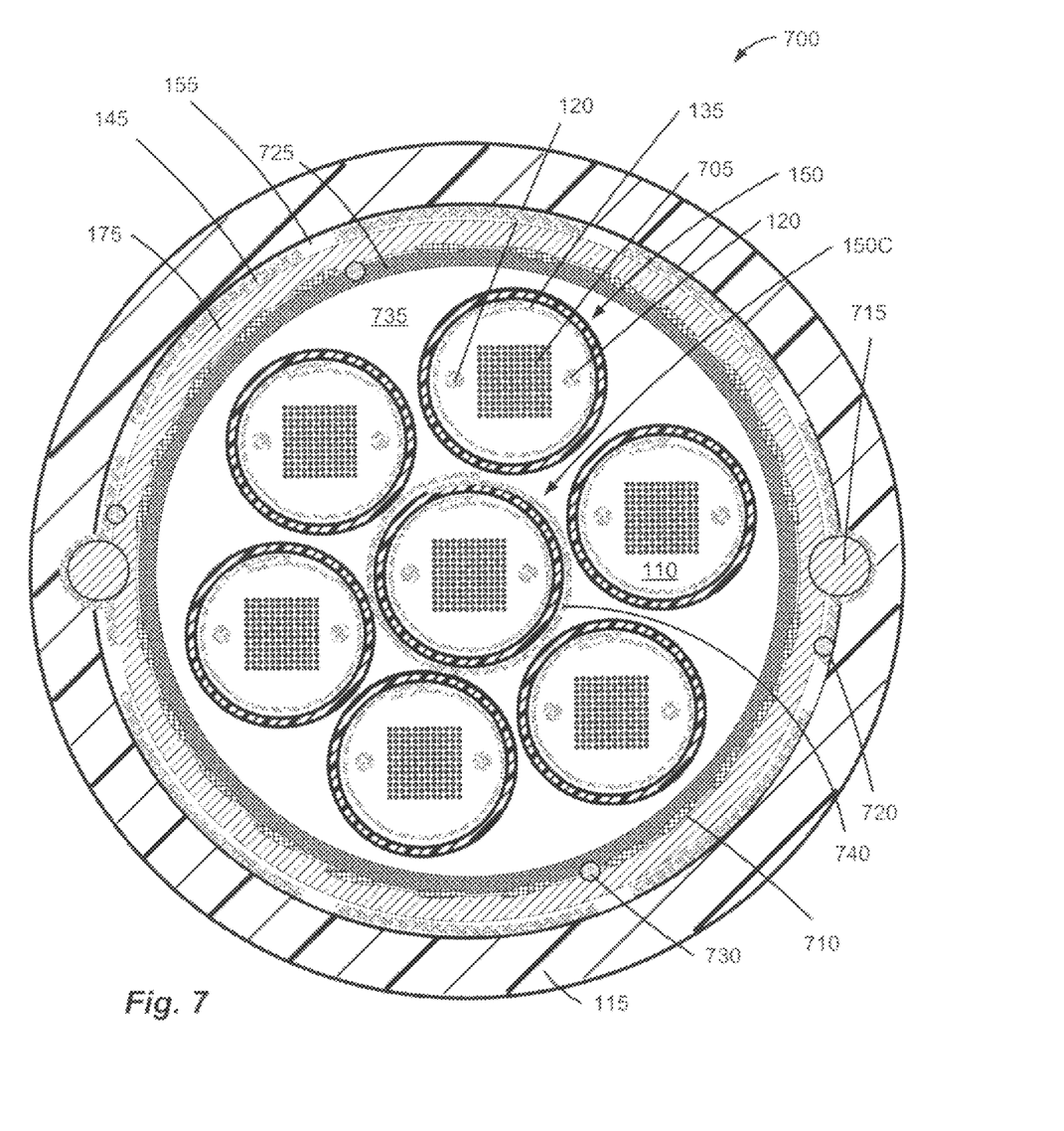
FIG. 7 is a cross sectional illustration of an exemplary fiber optic cable that provides controlled coupling between a jacket and an armor of the cable in accordance with certain embodiments of the present invention.

Cabling technology will now be discussed more fully hereinafter with reference to FIGS. 1-7, which describe representative embodiments of the present invention. FIGS. 1, 2, and 3 respectively provide end-on, lengthwise, and detail cross sectional views of a representative fiber optic cable achieving controlled jacket-to-armor coupling. FIGS. 4 and 6 describe representative elements for controlling jacket-to-armor coupling. FIG. 5 describes representative tape fragments that can result from fabricating a tape that controls jacket-to-armor coupling. FIG. 7 provides an end-on view of another fiber optic cable that achieves controlled jacket-to-armor coupling.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIGS. 1, 2, and 3, these figures illustrate a fiber optic cable 100 that provides controlled coupling between a jacket 115 and an armor 175 of the cable 100 according to certain exemplary embodiments of the present invention. FIG. 1 provides an end-on view, FIG. 2 presents a side view, and FIG. 3 shows a detail view of an interface between the jacket 115 and the armor 175. As discussed in further detail below, the illustrated fiber optic cable 100 comprises an exemplary tape 145 that comprises holes 155 and that is disposed between the jacket 115 and the armor 175 for controlling jacket-to-armor coupling.

The jacket 115 of the fiber optic cable 100 forms an outer, cylindrical surface that provides environmental protection, including a moisture barrier. Generally, the jacket 115 further imparts the fiber optic cable 100 with strength and structural integrity. In the illustrated embodiment, the jacket 115 can be characterized as a sheath or a casing. The jacket 115 can have a polymer or polymeric composition, for example a fluoropolymer such as FEP, TFE, PTFE, PFA, etc.; or another polymer such as olefin, polyester, silicone, polypropylene, polyethylene, medium density polyethylene, or polyimide; or some other polymer or other material that provides acceptable strength, fire resistance, or abrasion and chemical properties as may be useful for various applications. Certain exemplary embodiments comprise thermoplastic material while other embodiments can comprise thermosetting plastic.

In the illustrated embodiment, the jacket 115 circumferentially covers an armor 175, which may comprise corrugated metal, offering mechanical protection, including crush resistance. In certain exemplary embodiments, the armor 175 comprises a shield, and the fiber optic cable 100 can be viewed as a shielded cable, for example. The armor 175 can provide electrical shielding for cable embodiments comprising copper conductors, such as twisted pairs, for example. The armor 175 can also provide a capability to conduct a tone or other signal applied for identification and location when the fiber optic cable 100 is buried or deployed in an underground application. Certain embodiments of the fiber optic cable 100 comprise other forms of armor, for example utilizing braided or interlocking metal, fiberglass, composite, or ceramic material(s).

The tape 145 located between the jacket 115 and the armor 175, controls coupling between the jacket 115 and the armor 175. The term "coupling," as used herein, generally refers to one or more interactions between elements or systems, and can encompass bonding, adhesion, adherence, fusion, friction, and/or contact.

The tape 145 comprises holes 155, the number and/or size of which can control the amount or level of coupling between the jacket 115 and the armor 175. As illustrated in the detail cross sectional view of FIG. 3, in certain embodiments, the jacket 115 bulges or protrudes into the holes 155 towards the armor 175. Such protrusion can occur during extrusion of the jacket 115 over the armor 175, for example. (For many embodiments of the fiber optic cable 100, the thickness of the tape 145 as viewed in FIG. 3 may be considered exaggerated.)

In certain embodiments, the jacket 115 contacts the armor 175 through the holes 155. In certain embodiments, the jacket 115 adheres to the armor 175 through the holes 155. In certain embodiments, the jacket 115 bonds to the armor 175 through the holes 155. In certain embodiments, the jacket 115 fuses to the armor 175 through the holes 155.

In certain exemplary embodiments, the armor 175 comprises a polymer coating applied over metallic surface. Such a polymer coating can bond the tape 145 and the armor 175 to one another during jacket extrusion or as a result of heat from an extrusion process. Further, a polymer coating can bond the jacket 115 to the armor 175 through the holes 155. In certain embodiments, the jacket 115 can bond to the tape 145 as well or alternatively.

In certain exemplary embodiments, the jacket 115 bulges or protrudes to contact a portion of the region of the armor 175 lying under each hole 155 without contacting all of the region of the armor 175 lying under each hole 155. For example, contact between the jacket 115 and the armor 175 may occur at the center of a hole 155 with separation present around the periphery of the contact. For example, a bulging or protruding portion of the jacket 115 can form a convex surface contour, the apex of which contacts the armor 175. In certain exemplary embodiments, the jacket 115 may bulge or protrude into the holes 115 without contacting the armor 175. Accordingly, a gap may exist between the jacket 115 and the armor 175 within each hole 155.

In certain exemplary embodiments, super absorbent powder or material is located in such a gap or may be encapsulated between the armor 175 and the jacket 115. Such powder or material may be present in the holes 155 as an artifact of a fabrication process or may be deliberately metered into the holes 155, for example.

In certain embodiments, the level of coupling between the jacket 115 and the armor 175 in an area of a hole 155 (or in areas of multiple holes 155) is substantially higher than the level of coupling between the jacket 115 and the armor 175 across continuous areas of the tape 145, i.e. across one or more hole-free regions of the tape 145. In certain embodiments, the level of coupling between the jacket 115 and the armor 175 in an area of a hole 155 (or in areas of multiple holes 155) is at least about ten times higher than the level of coupling between the jacket 115 and the armor 175 across continuous areas of the tape 145.

In certain exemplary embodiments, the fiber optic cable 100 comprises strength members (not illustrated in FIGS. 1, 2, and 3 but discussed below with reference to FIG. 7), such as slender steel or fiberglass rods or aramid cords, disposed between the armor 175 and the jacket 115. For example, two radial strength members can be located under the jacket 115 to enhance structural support. Such members may be positioned either over or under the tape 145.

One or more "rip cords" may also be disposed between the jacket 115 and the armor 175 to facilitate separating the jacket 115 from the armor 175 via pulling the rip cords. Such rip cords can help open the fiber optic cable 100 for installation or field service. In certain embodiments, one or more rip cords can be disposed under the tape 145. In certain embodiments, one or more rip cords can be disposed over the tape 145.

In the illustrated embodiment, the fiber optic cable 100 also comprises a buffer tube 150 disposed beneath the armor 175. In certain exemplary embodiments, some annular gap may be present between the buffer tube 150 and the armor 175. Any such gap can also be filled if desired, for example with water-swellable material. Ordinarily, the buffer tube 150 and the armor 175 can be essentially flush with one another. Alternatively, the fiber optic cable 100 can be free of buffer tubes, for example utilizing buffered optical fibers that can be deployed effectively without an accompanying buffer tube.

The term "buffer tube," as used herein, generally refers to a tube for containing one or more optical fibers and for providing such optical fibers annular space for lateral movement. When a fiber optic cable is bent, optical fibers in a buffer tube of the cable may move towards one side of the buffer tube, for example.

In certain exemplary embodiments, the fiber optic cable 100 comprises an aramid material or some other form of strength member disposed between the buffer tube 150 and the armor 175. One or more rip cords may also be disposed between the buffer tube 150 and the armor 175 to facilitate opening the armor 175 in connection with terminating the fiber optic cable 100, or performing some related service.

In an exemplary embodiment, the buffer tube 150 extends along the cable's longitudinal axis and is formed from high density polyethylene. The buffer tube 150 provides a space 110 for optical fibers 105 and protective materials. The space 110 is a three-dimensional or cylindrical volume extending along the fiber optic cable 100. In the illustrated exemplary embodiment, the protective materials comprise water-swellable yarns 120, tape fragments 122, and a water-swellable tape 135 disposed in the space 110 along with the optical fibers 105. In certain embodiments, loose SAP powder or particles can be disposed in the space 110. Accordingly, the buffer tube 150 contains a bundle of optical fibers 105 disposed "loose" in the tube's hollow interior.

As will be further discussed below, the tape fragments 122 can comprise cutout sections of the tape 145 that were removed from the tape 145 during a process for creating holes 155 in the tape. Accordingly, the tape fragments 122 can have a shape matching that of the holes 155, for example both being circular. Certain exemplary embodiments of the fiber optic cable 100 may not incorporate such tape fragments 122, as they may be optional for certain applications.

In certain exemplary embodiments, the fiber optic cable 100 comprises a gas such as air or nitrogen in the space 110, with such gas contacting the optical fibers 105, the water-swellable yarns 120, the tape fragments 122, and the water-swellable tape 135, for example. As discussed above, the space 110 can further contain loose SAP particles or powder that such gas may contact. In certain exemplary embodiments, the space 110 is essentially filled with solid, and gaseous materials, wherein the water-swellable yarns 120, the water-swellable tape 135, the tape fragments 122, and the optical fibers 105 (which may comprise glass) are solid materials. Accordingly, the fiber optic cable 100 can comprise a "dry cable" that is substantially free from gels, greases, or fluids for protecting the optical fibers 105 from unwanted water or moisture incursions or for helping maintain the buffer tube's shape. The term "dry," as used herein in the context of characterizing a fiber optic cable or a element thereof, generally indicates that the fiber optic cable or element does not incorporate fluids, greases, or gels for blocking water incursion.

In certain embodiments, the fiber optic cable 100 can comprise voids within the buffer tube 150 that are filled with gaseous matter or that are otherwise free from water-blocking gels, greases, or fluids. In one exemplary embodiment, the space 110 is filled by, consists of or essentially consists of: (a) dry water-blocking materials; (b) air; and (c) the optical fibers 125. Nevertheless, trace or residual materials may be present in the space 110, for example contaminates, moisture, debris, water that the water-blocking materials are addressing, secondary materials present from manufacturing, and related matter. Such dry water-blocking materials can include the water-swellable yarns 120, the water-swellable tape 135, and/or the tape fragments 122. As discussed further below, in certain embodiments, the tape fragments 122 can comprise water-swellable material while in another embodiments, the tape fragments 122 can consist of fragments of tape substrate that are substantially stable dimensionally when exposed to water.

As an alternative to a dry cable, the tape 145 with holes 155 can be applied between a jacket 115 and an armor 175 of a fiber optic cable that comprises, or is filled with, one or more water-blocking gels, greases, or fluids, thereby controlling jacket-to-armor coupling.

In the illustrated exemplary embodiment, the fiber optic cable 100 contains 48 optical fibers 105 in the buffer tube 150. The optical fibers 105 can form a bundle with ribbons of the optical fibers 105 adhering to one another to form a single unit. A twist in the bundle of optical fibers 105 along the length of the fiber optic cable 100 captures the ribbon stack into a single unit and helps distribute bending stresses among individual optical fibers 105. That is, a stack of ribbons of optical fibers 105 exhibits a lay or a periodic rotation about its central axis. The bundle of optical fibers 105 has freedom of motion within the buffer tube 150, as the inner diameter of the buffer tube 150 is somewhat larger than the diagonal of the bundle's cross section. In one exemplary embodiment, the ratio of the bundle's diagonal to the inner diameter of the buffer tube 150 is between about 0.62 and about 0.85.

Accordingly, in certain exemplary embodiments, the optical fibers 105 are organized in linear arrays or "ribbons" of optical fibers 105, with the arrays stacked on top of one another. For example, each ribbon may include twelve optical fibers 105, with the ribbons stacked to achieve the desired fiber capacity (typically up to 18 ribbons).

The illustrated number of optical fibers 105 and the illustrated configuration are intended to be exemplary rather than limiting. Each optical fiber 105 could be a single mode fiber or some other optical waveguide that carries communications data. In various exemplary embodiments, the optical fibers 105 can be single mode or multimode and can have a composition based on glass, glassy, or silica material. Alternatively, the optical fibers 105 can incorporate plastic material as an optical transmission medium.

In certain exemplary embodiments, electrically conductive wires, such as twisted pairs of individually insulated electrical conductors, are substituted for the optical fibers 105. Thus, the present technology for controlling jacket-to-armor coupling can be applied to communications cables that incorporate electrically conductive media rather than optical fibers (or in addition to optical fibers), coax cables, twisted pair cables, and hybrid fiber-copper cables, for example.

In the illustrated exemplary embodiment, the buffer tube 150 contains tape fragments 122, four water-swellable yarns 120, and one water-swellable tape 135 for protecting the optical fibers 105. The number of water-swellable yarns 120 and the number of water-swellable tapes 135 are exemplary rather than limiting. In certain exemplary embodiments, tape fragments 122 occupy at least about 0.1 percent of the total volume of the space 110. Other embodiments may have a higher or lesser volume of tape fragments 122, or no tape fragments 122 at all.

Strands of the water-swellable yarn 120 lie alongside the optical fibers 105, typically in random locations and orientations. In an exemplary embodiment, the four illustrated strands of water-swellable yarns 120 are 1800 denier water-swellable yarn, such as those Geca Tapes BV of Bailleul, France sells under the product designator "Geca GTB-50." In certain embodiments, the water-swellable yarns 120 can be slightly expanded in cross section when introduced into the buffer tube 150 during cable fabrication.

In an exemplary embodiment, the water-swellable yarn 120 comprises particles of SAP that cling to yarn filaments. In certain exemplary embodiments, the particles cling without any adhesives, binders, cured materials, or wetted surfaces. The superabsorbent material chemically reacts with water, when present. However, in certain exemplary embodiments, the superabsorbent material is insoluble (or essentially insoluble) in water.

In one exemplary embodiment, the superabsorbent material comprises sodium polyacrylate powder. The term "super absorbent polymer" or "SAP," as used herein, generally refers to a material that can absorb or otherwise capture at least 50 times its weight in water (including without limitation liquid and vapor forms of water) or a liquid. Polyacrylonitrile starch graft polymer, saponified polyacrylonitrile starch graft polymer, polyacrylamide, and sodium polyacrylate are examples of SAP; however, this is not an exhaustive list. Typically, SAP swells or may assume a gelatinous state in the presence of water, thereby absorbing the water. SAP materials may have a granular or powder form, may be beads, or may have a variety of shapes. Many SAP materials can absorb 100 times their weight in water.

The term "water-swellable yarn," as used herein, generally refers to a yarn that comprises a super absorbent polymer, with the term encompassing yarn in which super absorbent polymer clings to a yarn surface. Yarn may comprise one or more threads, filaments, cords, ropes, fibrous materials, fibers, strands, or similar structures that may include man-made or natural materials.

The water-swellable yarns 120 may offer mechanical functionality in addition to absorbing water. The water-swellable yarns 120 can provide a "cushioning" effect to mitigate contact between the optical fibers 105 and the buffer tube 150, thereby improving signal quality. Orienting the water-swellable yarns 120 along the fiber optic cable's longitudinal axis, rather than helically wound around the optical fibers 105, avoids the water-swellable yarns 120 constricting the optical fibers 105 when the fiber optic cable 100 is strained.

The water-swellable yarns 120 and tape fragments 122 can inhibit water flow into the fiber optic cable 100 and along the space 110 of the fiber optic cable 100. The water-swellable yarns 120 and tape fragments 122 may respond faster than the water-swellable tape 135 to initial water incursion, while the water-swellable tape 135 can absorb water over an extended amount of time. Accordingly, the water-swellable yarns 120 and tape fragments 122 can offer the water-swellable tape 135 sufficient time to respond and swell to absorb water.

The water-swellable tape 135 within the buffer tube 150 extends lengthwise in the buffer tube 150 and is formed or wrapped around the bundle of optical fibers 105. More specifically, the water-swellable tape 135 runs generally parallel to the bundle of optical fibers 105 and is curled lengthwise over the bundle of optical fibers 105. As a result of curling, one surface of the water-swellable tape 135 is adjacent and essentially parallel to the interior surface of the buffer tube 150. One lengthwise edge of the water-swellable tape 135 is placed over the tape's other lengthwise edge so that the water-swellable tape 135 fully circumscribes the bundle of optical fibers 105. Geca Tapes BV is a suitable tape supplier, for example the product designated "Geca GFX-1135."

The term "water-swellable tape," as used herein, generally refers to a slender strip of material that comprises a super absorbent polymer, with the term encompassing tape in which super absorbent polymer clings to a tape surface. The slender strip of material can comprise a ribbon, a strip of cloth, a strip of film, etc. and may include one, two, or more different types of materials.

In an exemplary embodiment, the water-swellable tape 135 in the buffer tube 150 comprises a single layer of non-woven polyester with particles of superabsorbent polymer powder adhering loosely to one surface thereof. In one exemplary embodiment, the substrate material is not necessarily inherently flame retardant. The particles typically cling to the polyester substrate without any adhesives, curing, or intervening materials. Alternatively, one or more adhesive agents may adhere SAP to the tape substrate. The non-woven substrate can be porous, with SAP particles disposed in, but not necessarily filing the pores. The thickness and width of the substrate (and of the water-swellable tape 145 itself) can be controlled to optimize water blocking.

The side of the water-swellable tape 135 to which the SAP particles adhere typically faces the optical fibers 105, while the opposite, bare side contacts the interior wall of the buffer tube 150 and thus faces outward. The water-swellable tape 135 and the water-swellable yarn 120 typically comprise similar chemicals for water absorption. In an exemplary embodiment, the water-swellable tape 135 can be non-compressible, without necessarily needing any foam material, foam layers, adhesives, binders, cured agents, or wetted material.

In certain exemplary embodiments, a water-swellable tape (not illustrated in FIGS. 1 and 2) is located immediately outside the buffer tube 150 and is curled over the buffer tube 150 in essentially the same manner that the illustrated water-swellable tape 135 is curled over the bundle of optical fibers 105. Such an outer water-swellable tape typically may have the same structure, composition, and features as the illustrated water-swellable tape 135. However, one difference between the outer water-swellable tape and the illustrated water-swellable tape 135 is that the outer water-swellable tape may be wider to accommodate the larger circumference needed to cover the outer surface of the buffer tube 150. Accordingly, the outer tape can comprise a single ply of polyester material coated with SAP particles on one side thereof, with the coated side facing inward.

Exemplary embodiments of the tape 145 and the tape fragments 122 will be further discussed with reference to FIGS. 4 and 5. FIG. 4 illustrates a plan view of a section of the tape 145 for disposing between a jacket 115 and an armor 175 of a fiber optic cable 100 according to certain exemplary embodiments of the present invention. FIG. 5 illustrates tape fragments 122 that can be disposed in a fiber optic cable 100 according to certain exemplary embodiments of the present invention.

The tape 145 illustrated in FIG. 4 extends lengthwise along the fiber optic cable 100 (as shown in FIGS. 1, 2, and 3 and discussed above) and is formed or wrapped around the armor 175. In an exemplary embodiment, the tape 145 is curled lengthwise over the armor 175. Accordingly, an interior facing surface of the tape 145 can adjoin the armor 175 while an exterior facing surface can adjoin, the jacket 115. One lengthwise edge of the tape 145 can be placed over the tape's other lengthwise edge so that the tape 145 full circumscribes the armor 175.

In certain exemplary embodiments, the tape 145 comprises a plastic or polymer material, which can be single ply or multi-ply. Thus, the tape 145 may comprise two or more layers or may be single layer. In certain exemplary embodiments, the tape 145 comprises polyester material; however, other materials can be utilized. One or more such layers, plastics, or polymers may comprise a platform or substrate for water-swellable materials or be utilized without any water-swellable materials. Accordingly, in certain exemplary embodiments, the tape 145 comprises one or more water-swellable materials representative examples of which are discussed above, including with reference to the water-swellable tape 135. Geca Tapes BV is a suitable tape supplier, for example the product designated "Geca GFX-1135."

In an exemplary embodiment, the tape 145 comprises a single layer of non-woven polyester with particles of super-absorbent polymer powder adhering loosely to one or both major surfaces thereof. In certain exemplary embodiments, the tape 145 comprises one-ply, typically non-woven polyester, and is impregnated with an SAP powder, such as a sodium polyacrylate or a potassium polyacrylate/acrylamide copolymer. In one exemplary embodiment, the substrate material is not necessarily inherently flame retardant. Some or all of the particles may cling to the polyester substrate without any adhesives, curing, or intervening materials. Alternatively, one or more adhesive agents may adhere SAP to the tape substrate. The non-woven substrate can be porous, with SAP particles disposed in, but not necessarily filing the pores.

In certain exemplary embodiments, a side of the tape 135 to which the SAP particles adhere faces the armor 175, while the opposite, bare side faces and contacts jacket 115. In certain exemplary embodiments, a side of the tape 135 to which the SAP particles adhere faces the jacket 115, while the opposite, bare side faces and contacts the armor 175.

In certain embodiments, the tape 145, the water-swellable tape 135, the water-swellable yarn 120, and the tape fragments 122 (if incorporated) may comprise similar or common chemicals for water absorption. In an exemplary embodiment, the tape 145 can be non-compressible, without necessarily needing any foam material, foam layers, adhesives, binders, cured agents, or wetted material. Alternatively, the tape 145 can comprise one or more foam materials or foam layers.

FIG. 4 illustrates an exemplary pattern of the holes 155 on the tape 135, which can be viewed as including rows and columns of holes 155. Other patterns may be utilized. In certain embodiments, the holes 155 are created in the tape 135 without attempting to create a long-term pattern. Accordingly, the holes 155 may be arranged according to a predetermined design, in a manner that is periodic stemming from a fabrication process or machine, or with at least some degree of randomness. In certain embodiments, the holes 155 can result from a woven mesh as an alternative to hole punching.

In certain exemplary embodiments, the tape 145 is fabricated by utilizing commercially available tape as stock. For example, the product of Geca Tapes BV designated "Geca GFX-1135" can serve as stock material. In another embodiment, the tape 145 is made from the commercial water-swellable tape product available from Chengdu Centran Industrial Co., Ltd of Sichuan, China under the trade identifier "Centran CZSD-20."

Such commercial tape can be converted into the illustrated tape 145 via running the commercial product through a continuous punch operation that creates the holes 155 and produces the tape fragments 122. For example, the stock material can be fed into a nip formed between a pair of cooperating die wheels. An embossed cutting or punching pattern on the outer surface of one of the wheels can cut or punch the holes 155 as the wheels rotate. Each formed hole 155 can result in a tape fragment 122. The rotating wheels can have meshed or mated cutting surface features, for example. Alternately, usable lengths of the tape 145 could be formed manually using the type of hole punch that is commonly used for punching holes in loose leaf paper, with the tool modified to make smaller holes, if desired.

In certain exemplary embodiments, each of the holes 155 has a diameter that is between about 1 millimeter ("mm") and about 1 centimeter ("cm"). In certain exemplary embodiments, each of the holes 155 has a common diameter or may have diameters that are within about ten percent of one another. In certain exemplary embodiments, the holes 155 have intentionally different diameters. In certain exemplary embodiments, the longitudinal spacing between holes 155 is substantially consistent along the cable length. Alternatively, the longitudinal spacing may vary. In certain exemplary embodiments, the holes 155 account for at least ten percent of the surface area of the tape 145. In certain exemplary embodiments, the holes 155 account for between about ten and about seventy-five percent of the surface area of the tape 145.

As illustrated in FIG. 5, in certain embodiments, the tape fragments 122 can have substantially the same form or geometry as the holes 155. Further the holes 155 and tape fragments 122 can have common dimensions and sizes, as the tape fragments 122 can result from a punching or cutting operation as discussed above.

Turning now to FIG. 6, this figure illustrates a plan view of a section of a tape 145 for disposing between a jacket 115 and an armor 175 of a fiber optic cable 100 according to certain exemplary embodiments of the present invention. The embodiment of the tape 145 illustrated in FIG. 6 comprises holes 155 of various geometric shapes. Representative examples of such geometric forms include, without limitation, five pointed stars, seven pointed stars, crosses, pentagons, rectangles with sharp corners, rectangles with rounded corners, squares, right triangles, equilateral triangles, octagons, hexagons, circles, and ovals (not an exhaustive list). In certain embodiments, the geometric form or forms may be selected to provide desired coupling as may be beneficial for an application.

Turning now to FIG. 7, this figure illustrates a cross sectional view of a fiber optic cable 700 that provides controlled coupling between a jacket 115 and an armor 175 of the cable 700 according to certain exemplary embodiments of the present invention. In certain exemplary embodiments, the fiber optic cable 700 can comprise multiple ones of the units illustrated in FIGS. 1, 2, and 3 and discussed above in a package that comprises at least one tape 145 comprising holes 155 and operable to control coupling between two adjacent cable elements.

As illustrated, the fiber optic cable 700 comprises a ring of buffer tubes 150 disposed about a central buffer tube 150C. More specifically, the illustrated fiber optic cable 700 comprises a six-around-one configuration whereby six buffer tubes 150 are disposed generally about or can be stranded around a seventh buffer tube 150C. In certain exemplary embodiments, the buffer tubes 150, 150C are substantially identical to one another or are manufactured to a common specification. In certain exemplary embodiments, the elements and configuration within each of the buffer tubes 150, 150C can be substantially identical or made to a common manufacturing specification.

The illustrated configuration synergistically combines ruggedness provided by buffer tube stranding with a fully operational central buffer tube 150C to achieve high loading capacity and high cable strength. Accordingly, the fiber optic cable 700 can carry a large number of optical fibers in a compact diameter. For example, the configuration of the illustrated embodiment can support a capacity of 1008 optical fibers.

Each buffer tube 150, 150C carries or encloses a stack of fiber optic ribbons 705, two or four water-swellable yarns 120, and a water-swellable tape 135. In the illustrated embodiment, the water-swellable tape 135 contacts or adjoins the inner surface of the associated buffer tube 150, 150C, the water-swellable yarn 120, and the stack of fiber optic ribbons 705. Further, the stack of fiber optic ribbons 705 contacts or adjoins the water-swellable yarn 135. In certain embodiments, tape fragments 122 (as illustrated in FIGS. 1, 2, and 5, but not in FIG. 7) may be included in the buffer tubes 150, 150C.

In certain exemplary embodiments, the water-swellable tape 135 comprises single-ply, typically non-woven polyester, and is impregnated with an SAP powder, such as a sodium polyacrylate or a potassium polyacrylate/acrylamide copolymer. In an exemplary embodiment, the water-swellable tape 135 runs along and contacts the inner wall of its associated buffer tube 150, 150C, with the SAP powder disposed on the side of the water-swellable tape 135 that faces the stack of fiber optic ribbons 705. The water-swellable tape 135 can be a type known in the trade as "Geca GFX-1135," as discussed above.

The water-swellable yarns 120 can be a type known in the trade as "Geca GTB-50" as discussed above, and can block potential water channels. The buffer tubes 150, 150C can be tested and rated to typical industry standards, such as Telcordia GR-20-CORE, RDUP Bulletin 1753F-601 (PE-90) and ANSI/ICEA S-87-640, for mechanical and environmental performance requirements.

In the illustrated embodiment, each stack of fiber optic ribbons 705 comprises 12 fiber optic ribbons, with each ribbon comprising 12 optical fibers. Other embodiments can comprise fewer or more ribbons, ribbons with fewer or more optical fibers, or optical fibers that are not ribbonized, for example. Accordingly, the illustrated numbers of optical fibers, ribbons, and buffer tubes is exemplary, is non-limiting, and is among others that exemplary embodiments of the present invention can support.

As illustrated, another water-swellable tape 740 is applied over the central buffer tube 150C, between the central buffer tube 150C and the six surrounding buffer tubes 150. Suitable product for this water-swellable tape 740 is available from Chengdu Centran Industrial Co., Ltd of Sichuan, China under the trade identifier "Centran CZSD-20." The water-swellable tape 740 helps prevent water flow in the open space 735 of the cable core. In certain embodiments, tape fragments 122 (as illustrated in FIGS. 1, 2, and 5, but not in FIG. 7) may be disposed in the open space 735.

Various structures benefiting from controlled coupling achieved with a tape 145 having holes 155 can be disposed over the buffer tubes 150, 150C to provide strength and protection. In the illustrated embodiment, a jacket 115 forms the cable's exterior surface. The jacket 115 can comprise a medium density polyethylene, for example. An armor 175 is located under the jacket 115 and provides crush resistance. The armor 175 can comprise a corrugated metal, flexible interlocking structure or other appropriate system for providing mechanical protection. The tape 145 incorporates holes 155 to achieve controlled jacket-to-armor coupling as discussed above.

Two ripcords 720 are disposed between the armor 175 and the jacket 115 to facilitate jacket removal. Two high-strength ripcords 730 are disposed under the armor 175 to facilitate armor removal 175 during field service or cable installation.

A longitudinally wrapped water-swellable tape 725 is disposed under the armor 175, facing the buffer tubes 150, 150C. Water-swellable glass strength yarns 710 provide additional support and longitudinal strength. As illustrated, the fiber optic cable 700 comprises 24 of the water-swellable glass strength yarns 710 located between the water-swellable tape 725 and the armor 175. Alternatively, the water-swellable glass strength yarns 710 can be disposed under the water-swellable tape 725, for example adjoining the ring of buffer tubes 150.

As illustrated, two rigid strength members 715 are located between the jacket 115 and the armor 175. The rigid strength members 715 can be formed of carbon steel and can be placed at 3 and 9 o'clock positions or at 6 and 12 o'clock positions, for example. As illustrated, the tape 145 is positioned between the rigid strength members 715 and the jacket 115. Alternatively, the tape 145 can be positioned between the rigid strength members 715 and the armor 175.

Technology for protecting signal conductors, including controlling coupling between a cable armor and a cable jacket, has been described. The technology can be applied to other adjacent cable elements, as well. From the description, it will be appreciated that an embodiment of the present invention overcomes the limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:
1. A fiber optic cable comprising:
an armor, comprising metal, extending lengthwise;

an optical fiber disposed in a tubular volume defined by the armor;

a jacket, comprising a polymeric material, circumferentially covering the armor; and a tape disposed between the armor and the jacket, the tape comprising super absorbent material and holes, a plurality of the holes having a respective shape, wherein a plurality of pieces of tape material, each substantially matching the shape of a corresponding hole and comprising super absorbent material, are disposed in the tubular volume.

2. The fiber optic cable of claim 1, wherein the tape adjoins the armor and the jacket.

3. The fiber optic cable of claim 1, wherein the jacket contacts the armor through the holes.

4. The fiber optic cable of claim 1, wherein the holes define open areas, and wherein the jacket adheres to the armor through the open areas.

5. The fiber optic cable of claim 1, wherein the tape is water swellable, wherein a buffer tube is disposed in the tubular volume, and wherein the buffer tube houses a ribbon of optical fibers that comprises said optical fiber.

6. The fiber optic cable of claim 1, further comprising:

water-swellable material disposed in at least one of the holes.

7. The fiber optic cable of claim 1, wherein the tape is operable to block water from flowing along the cable between the armor and the jacket and to provide a predetermined level of coupling between the armor and the jacket, and wherein each hole is a cutout.

8. The fiber optic cable of claim 1, wherein the armor further comprises a polymer, and wherein the jacket adheres to the armor through the holes via adhering to the polymer.

9. The fiber optic cable of claim 1, wherein one side of the tape has a surface area, and wherein the holes account for no less than approximately 10 percent of the surface area.

10. A fiber optic cable comprising:

a buffer tube circumscribing a plurality of optical fibers;

a metallic armor comprising a polymeric coating and circumscribing the buffer tube;

a water-swellable tape circumscribing the metallic armor; and an outer jacket comprising a thermoplastic material and circumscribing the metallic armor, wherein the thermoplastic material adheres to the polymeric coating through holes in the water-swellable tape, and wherein water-swellable powder is disposed in the holes of the water-swellable tape between the metallic armor and the outer jacket.

11. The fiber optic cable of claim 10, wherein the fiber optic cable comprises a hybrid cable.

12. The fiber optic cable of claim 10, wherein the holes collectively occupy about 10 to about 75 percent of total surface area of the water-swellable tape.

13. The fiber optic cable of claim 10, wherein the water-swellable tape is operable to provide a predetermined amount of coupling between the metallic armor and the outer jacket.

14. The fiber optic cable of claim 10, wherein a stack of ribbons of optical fibers comprises the plurality of optical fibers, and wherein the fiber optic cable further comprises a rigid strength member adjoining the outer jacket and extending lengthwise.

15. The fiber optic cable of claim 10, wherein water-swellable tape fragments are disposed in the buffer tube.

16. A fiber optic cable comprising:

a plurality of buffer tubes extending along the fiber optic cable;

a plurality of bundles of optical fibers respectively disposed in the plurality of buffer tubes;

an armor, comprising metal, covering the plurality of buffer tubes and extending lengthwise;

a tape formed around the armor and extending lengthwise, the tape comprising water-swellable material and a pattern of cutout areas, the cutout areas comprising between approximately ten and approximately seventy-five percent of the surface area of the tape;

water-swellable material disposed in at least one cutout area; and a jacket comprising a thermoplastic material, the jacket disposed over the tape and protruding substantially through the cutout areas to adhere with the armor.

17. The fiber optic cable of claim 16, further comprising:

cutout remnants of the tape disposed in at least one of the plurality of buffer tubes.

18. The fiber optic cable of claim 16, wherein the plurality of buffer tubes are dry buffer tubes, wherein tape remnants are disposed in a core of the fiber optic cable, wherein the pattern of cutout areas defines a level of coupling between the armor and the jacket, and wherein each bundle of optical fibers comprises a ribbon of optical fibers.

19. The fiber optic cable of claim 16, wherein the cutout areas provide a first level of coupling between the jacket and the armor, wherein other areas of the tape provide a second level of coupling between the jacket and the armor, and wherein the first level is at least about ten times higher than the second level.

20. The fiber optic cable of claim 16, wherein the armor comprises corrugated steel and a polymer that adheres to the tape.

* * * * *